(12) United States Patent
Weaver et al.

(10) Patent No.: US 11,104,809 B2
(45) Date of Patent: Aug. 31, 2021

(54) LOW TEMPERATURE CURE POWDER COATING COMPOSITIONS

(71) Applicant: ALLNEX Netherlands B.V., RB Bergen op Zoom (NL)

(72) Inventors: William Weaver, Tyne and Wear (GB); Robert Watson, Surrey (GB); Richard Hendrikus Gerrit Brinkhuis, JX Zwolle (NL); Martin Bosma, Arnhem (NL); Paul Jones, Greater London (GB); Steve White, Rayleigh (GB); Dimitrios Baxevanis, London (GB); Roberto Cavalieri, Padua (IT)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 69 days.

(21) Appl. No.: 16/314,483

(22) PCT Filed: Jul. 4, 2017

(86) PCT No.: PCT/EP2017/066616
§ 371 (c)(1),
(2) Date: Dec. 31, 2018

(87) PCT Pub. No.: WO2018/007373
PCT Pub. Date: Jan. 11, 2018

(65) Prior Publication Data
US 2019/0161625 A1 May 30, 2019

(30) Foreign Application Priority Data
Jul. 4, 2016 (EP) .................................... 16177816

(51) Int. Cl.
| | | |
|---|---|---|
| C09D 5/03 | (2006.01) |
| C08L 63/00 | (2006.01) |
| C09D 163/00 | (2006.01) |
| C09D 173/02 | (2006.01) |
| C09D 167/00 | (2006.01) |
| C09D 7/63 | (2018.01) |
| C09D 167/03 | (2006.01) |
| C08K 5/50 | (2006.01) |
| C08L 73/02 | (2006.01) |

(52) U.S. Cl.
CPC .............. *C09D 5/033* (2013.01); *C08L 63/00* (2013.01); *C09D 5/03* (2013.01); *C09D 7/63* (2018.01); *C09D 163/00* (2013.01); *C09D 167/00* (2013.01); *C09D 167/03* (2013.01); *C09D 173/02* (2013.01); *C08K 5/50* (2013.01); *C08L 73/02* (2013.01)

(58) Field of Classification Search
None
See application file for complete search history.

(56) References Cited

U.S. PATENT DOCUMENTS

| | | | |
|---|---|---|---|
| 9,169,419 B2 | 10/2015 | Buijssen et al. | |
| 2004/0235984 A1* | 11/2004 | Nicholl | C09D 133/08 523/200 |
| 2012/0107629 A1* | 5/2012 | Moens | C08L 67/02 428/480 |

FOREIGN PATENT DOCUMENTS

| | | |
|---|---|---|
| EP | 2 272 927 | 1/2011 |
| EP | 2 411 459 | 9/2012 |
| WO | 97/16473 | 5/1997 |

OTHER PUBLICATIONS

International Search Report dated Oct. 19, 2017 in International Application No. PCT/EP2017/066616.
Written Opinion of the International Searching Authority dated Oct. 19, 2017 in International Application No. PCT/EP2017/066616.

* cited by examiner

Primary Examiner — Robert T Butcher
(74) Attorney, Agent, or Firm — Wenderoth, Lind & Ponack, L.L.P.

(57) ABSTRACT

The invention relates to a powder coating composition for low temperature curing that can be used on temperature sensitive substrates and, despite of the low curing temperature, has excellent flow properties and forms a coating with excellent appearance and nevertheless also good mechanical and weathering properties. The invention also relates to an advantageous process for the manufacture of the powder coating composition. Said powder coating composition comprises a poly-acid functional polyester component A, a poly-epoxy functional component B, a poly-anhydride functional component C and a thermosetting curing catalyst D. The invention also relates to a polyester for use in the powder coating compositions according to the invention, in particular for durable powder coatings.

15 Claims, 2 Drawing Sheets

LOW TEMPERATURE CURE POWDER COATING COMPOSITIONS

FIELD OF THE INVENTION

The invention relates to a powder coating composition that is curable at relatively low temperatures, to a process for the manufacture of such a composition, a process for coating a substrate using the powder coating composition of the invention at lower temperatures and coated objects having improved surface properties.

Powder coatings which are dry, finely divided, free flowing, solid materials at room temperature, have gained popularity in recent years over liquid coatings. Despite their many advantages, nowadays thermosetting powder coatings generally are cured at temperatures of at least 150° C., typically about 160° C. Below these recommended temperature the coatings have poor appearance, as well as poor physical and chemical properties.

In consequence of this temperature restriction powder coatings are generally not employed in coating heat-sensitive substrates such as wood, in particular medium density fibre board (MDF), plastics and certain low melting metal alloys. Besides, there are the heavy metal pieces where conventional powder coatings require extremely long curing times in order to get the coating fully cured, conditions which are totally inconvenient from energetic point of view.

Recently there has been a good deal of effort in finding powder coatings that cure at lower temperature. Accordingly, the term lower temperatures generally implies a temperature lower than 160° C., preferably lower than 155° C., more preferably lower than 150° C., even more preferably lower than 145° C. and most preferably 140° C. or lower. Powder coating compositions developed thus far, either are developed for conventional curing schedules or, at low curing temperatures, present drawbacks or limitations when a combination of performances such as a smooth aspect along with a good surface hardness are desired.

In particular, acid functional polyester/epoxy curing systems are used in powder coating applications. Usually these powder coatings are cured at temperatures ≥160° C. Developments are ongoing to reduce curing temperatures with the focus on green technologies and corresponding pressure to reduce energy costs and to be able to coat temperature sensitive substrates with powder coatings.

It has generally been found that it is difficult to achieve sufficient film crosslink density when curing at temperatures below 160° C. and especially at or below 140° C. to achieve suitable chemical resistance, mechanical and weathering properties whilst maintaining good flow and appearance. Poor appearance is expected due to worse flow at reduced curing temperatures. Additionally, the Tg of the polymer, and the Tg of resultant unapplied powder coating formulated from it, must be high enough to ensure suitable storage stability.

Systems do exist which cure at very low temperatures in the range between 120-130° C. These tend to be either epoxy curing hybrid or triglycidyl isocyanurate (TGIC) curing pure polyester systems. Generally, such systems suffer from poor appearance and are only used to produce textured coatings. In the case of hybrids, these are not suitable for exterior applications where weatherability is a requirement.

Glycidyl methacrylate (GMA) acrylics are used in acrylic powder coatings and are cured with anhydrides. They are known to cure at 130° C. and have good flow. However, acrylic powders are niche.

There is a general struggle and desire to balance mutually counteractive desirable properties of, on one hand, good flow and good coating appearance and, on the other hand, having low curing temperature, sufficiently good chemical resistance and mechanical properties, high curing speed.

DESCRIPTION OF THE RELATED ART

EP2411459 relates to thermosetting powder coating composition comprising a crosslinker and a polyester wherein the polyester has functional groups which functional groups are capable of reacting with beta-hydroxyalkylamide groups, wherein the polyester is a carboxylic acid functional polyester comprising neopentylglycol, a difunctional alcohol other than neopentylglycol, isophthalic acid, terephthalic acid, optionally adipic acid and a branching monomer wherein the crosslinker is a compound having beta-hydroxyalkylamide groups.

Polyesters comprising both isophthalic acid and terephthalic acid have a relatively low durability. Powder coatings based on polyesters comprising predominantly only isophthalic acid in combination with hydroxyalkylamide crosslinking agents have a very good durability but the disadvantage that the resulting coating has relatively low impact resistance and easily form cracks and chip off on impact. A further disadvantage of such coating composition is that they suffer from aging, which causes the mechanical coating properties to deteriorate over time. Branching monomers may increase crosslinking and improve mechanical properties to some extent but the flow properties are impaired leading to reduction of the coating appearance (smoothness, gloss).

EP2272927 describes low temperature cure powder coating compositions which comprises a mixture of at least one carboxylic acid group containing first polyester, at least one component selected from the group consisting of at least one second polyester having a glass transition temperature ~+45° C. and/or at least one crystalline polycarboxylic acid; at least one glycidyl group containing acrylic copolymer and a further compound and/or resin having functional groups reactable with the carboxylic acid groups; and at least one thermosetting curing catalyst.

The polyesters described in the examples have a relatively low durability. Further, in practice a polyester composition is produced first and then the powder coating manufacturer has to mix the at least one glycidyl group containing acrylic copolymer into the polyester composition. The prior art composition has processing disadvantages and associated risks and limitations to product properties because the mixing requires melting of the polyester and the epoxy-functional acrylic polymer and exposing these reactive components to high temperature, which leads to risk of premature reaction and/or limitations to the processing window and product properties. In particular it is more difficult to achieve low curing temperatures because then the disadvantageous premature curing can also already occur at lower temperatures.

A disadvantage of the prior art powder coating composition is that the resulting coatings suffer from having poor coating appearance when curable at low temperatures below 140° C. and/or suffer from premature curing and storage instabilities after mixing the reactive components. Also the prior art powder coating compositions have the problem of aging, poor impact resistance when formulated with high IPA content to achieve good durability.

SUMMARY OF THE INVENTION

The present invention addresses one or more of these problems by providing a powder coating composition for low temperature curing comprising:
- a. a poly-acid functional polyester component A,
- b. a poly-epoxy functional component B,
- c. a poly-anhydride functional component C;
- d. a curing catalyst D
  wherein component A has an acid number AV of 20 to 50 mg KOH/g and a hydroxyl number OHV of less than 15 mg KOH/g.

According to the invention the poly-acid functional polyesters have good flow when formulated into powder coatings and cured at low temperatures of preferably around 130-140° C. with epoxy group-containing crosslinkers. To achieve good flow, the polyesters are designed to impart a minimum level of crosslink density when cured through control of the acid functionality of the polyester by a low acid value and by a low hydroxyl value. The polyesters are deliberately sub optimal for impact and chemical resistance properties and designed to be used in conjunction with a poly-anhydride functional component C. A poly-anhydride functional component or a poly-anhydride means a compound having at least 2 anhydride groups. It was found that the anhydride groups are very reactive and despite the fact that the polyesters are designed to have minimum crosslink density and mechanical properties, the combination results in sufficiently high crosslink density to result in good coating properties. In another aspect the invention relates to the poly-acid functional polyester, the use thereof in a powder coating composition, in particular in a composition in combination with the poly-anhydride.

The powder coating composition formulated with an amount of catalyst to a resin gel time of 400 seconds (when determined at the curing temperature of 130-140° C.) resulted in very good and sufficient flow during heating to result in good coating appearance and at the same time sufficient mechanical and chemical resistance properties developed at 130-140° C.

The invention also relates to a process for the manufacture of such poly-acid functional polyester and the composition comprising poly-acid functional polyester in combination with the poly-anhydride functional component C, to a process for the manufacture of a powder coating composition and a process for the coating of a substrate, in particular temperature sensitive substrates, using the powder coating composition.

The powder coatings can advantageously be used in architectural, ACE and general industrial segments on metal. The advantage of low curing temperatures is relevant in applications for coating larger items which are slow to heat up to the cure temperature due to bulk mass of the item. Further, the advantage can be relevant in application for wood/MDF.

DETAILED DESCRIPTION OF THE INVENTION

Figure 1:
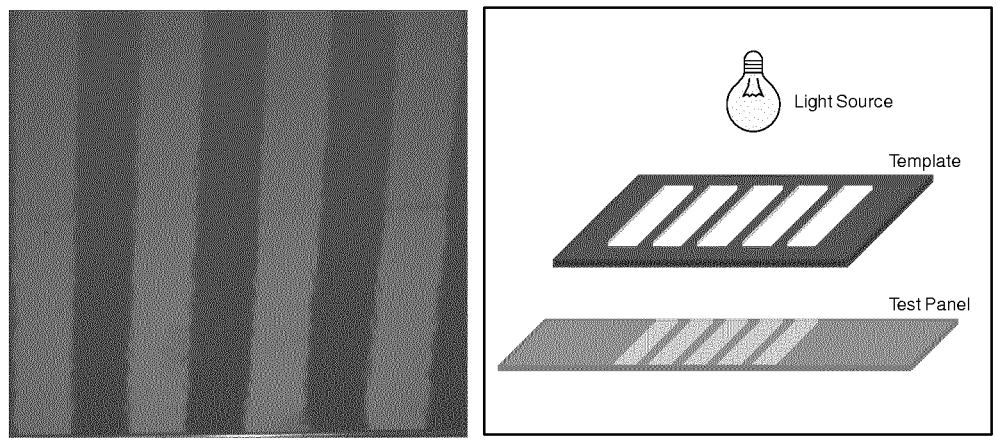
FIG. 1 shows a photographic image of the coating surface of Example PC4.

Poly-Acid Functional Polyester Component A,

Polyester component A may be linear or branched and may also be single component or a mixture of different poly-acid functional polyester components. In view of improving flow behavior, in particular at low temperatures, polyester component A preferably is as linear as possible. On the other hand, in view of improving the reactivity and chemical resistance of the coating, some branching is preferred. Branched polyester components A comprise at least 0.1 wt % branching monomers that comprise at least three functional groups, preferably tri- or tetrafunctional branching monomers.

Suitably, polyester Component A comprises polyacid branching monomers comprising at least three carboxyl groups, preferably selected from: trimellitic acid, pyromellitic acid and their corresponding anhydrides. Good balance of flow properties and chemical resistance can be achieved with polyester component A comprising an amount of the branching monomers below 9 wt % relative to the weight of polyester component A, more preferably below 8 wt %, or 7 wt %, and preferably 1 to 5 wt % or 1.5 to 4 wt %.

Alternatively, polyester component A comprises polyol branching monomers comprising at least three hydroxyl groups, preferably one or more trifunctional or tetrafunctional polyols and preferably selected from trimethylolpropane, glycerine, tris-(2-hydroxyethyl)-isocyanurate (THEIC), ditrimethylolpropane, pentaerythrytol and/or mixtures thereof. A good balance of good flow properties and good chemical resistance can be achieved with polyester component A comprising below 9 wt % relative to the weight of polyester component A, preferably below 7 wt %, more preferably from 1 up to 5.5 wt %, from 1 to 4.5 wt % or from 1.5 to 3 wt % of these branching monomers or, in case component A comprises a combination of polyol and polyacid monomers, with a total amount of these branching monomers below 9 wt %, preferably 7 wt %, and preferably 1 to 5.5 wt %, 1 to 4.5 wt % or 1.5 to 3 wt %.

The poly-acid functional polyester component A has an acid number AV of 20 to 50 mg KOH/g and a hydroxyl number OHV of less than 15 mg KOH/g in order to impart good flow properties through a minimum level of crosslink density when curing. Preferably, the acid number AV is 20 to 45, more preferably about 25 to 30 mg KOH/g. The hydroxyl number OHV is preferably less than 12, 10 or 8 and most preferably about 5 mg KOH/g or less. The polyester component A must be acid functional for crosslinking with the epoxy functional component B. In view of the preferred low crosslink density of the polyester component A, the acid functionality of Polyester component A is preferably between 1.5-3.5, preferably 1.5-3.0, more preferably 1.5-2.5 and can also be between 2.0 and 2.5 (functionality defined as the average number of acid groups per molecule as calculated by Mn/(56100/AV)).

In the powder coating composition of the invention polyester component A preferably has a number averaged molecular weight Mn, as determined with GPC, in the range between 1000-10000 gr/mole, preferably 2000-8000 gr/mole, more preferably 2500-5000 gr/mole and most preferably 2700-4500 gr/mole. The low Mn provides good fluidity and in combination with a minimum level of crosslink density through low OHV and AV provides good coating appearance.

In view of improving the reactivity and chemical resistance of the coating, some branching is preferred, which typically results in broader molar mass distribution of polyester component A. In one embodiment polyester component A comprises branching monomers and has a polydispersity Mw/Mn in the range between 1.3 and 5, more preferably between 1.3 and 4.5, even more preferably 2 to 4.2, and most preferably 2 to 4. However, in view of improving flow behavior, in particular at low temperatures, polyester component A preferably is substantially linear and the polyester component A preferably has a very low polydispersity Mw/Mn in the range between 1.3 and 3.2, more preferably between 1.3 and 2.5, even more preferably 2 to 2.4, and most preferably 2 to 2.3. The lower Mw/Mn indicates that the molar mass distribution is narrow meaning that the polymers are more linear and less branched which is a desired feature of the constituting polyester components in view of achieving that the polyester molecules will flow more freely past one another in the molten state resulting in better flow as compared to the prior art.

Component A is preferably formed from one or more polyol and one or more poly-acid constituents wherein of the poly-acid constituents in the polyesters at least 60%, preferably 70, 80, 90 or even at least 95 wt % are isophtalic acid and preferably less than 20 wt % are terephthalic acid. It was found that the coatings are highly durable. It is a particular advantage of the invention that it permits the use of high amount of isophtalic acid, even substantially 100 wt %, to achieve high durability without unacceptable deterioration of the impact resistance or of the coating appearance. It is believed that the combination of a polyester component A comprising a high amount of isophtalic acid with the polyanhydride component C has flexibility required for achieving sufficient crosslink density.

The component A has a DSC mid point Tg (as determined at heating rate of 10° C./min) preferably in the range 40-80° C., preferably 50-70° C., more preferably 59-66° C. The melting or glass transition temperature Tg/Tm must be sufficiently lower than the envisaged curing temperature, so well below 130° C., to allow melting well before reaction takes place and allow for mixing and film forming. On the other hand it must be high enough, well above room temperature, so well above 45° C., for mechanical properties of the powder (ie storage stability) in ambient use conditions.

In general, the process for the preparation of the poly-acid functional polyester A is known in the art. Preferably, the polyester preparation process is used comprising 2 steps including step 1) polymerizing a polyol and a polyacid to form a polyester and step 2) polymerizing at a higher temperature after removal of water formed in first step. The 2 step process reduces polyol evaporation that would occur at high polymerization temperature. Excess polyol is used in the first step and then Net OHV is measured to add di-acid in such amount, pre-calculated based on the measured Net OHV, that the polyester polymer chains are acid terminated.

The invention relates to a process for the manufacture of an acid functional polyester component A in a 2 step process comprising the steps of:
a. polymerizing the polyacid and polyol at elevated temperatures between 100 and 250° C. while distilling off water formed, optionally in the presence of a polyesterification catalyst,
b. determining the AV and the Net OHV and adding based on the measured Net OHV and AV a pre-calculated amount of polyacid and optionally also polyol to obtain after further polymerization a polyester having AV between 20 and 50 mg KOH/g and a OHV of less than 15 mg KOH/g.

The process provides good control of the acid functionality and polydispersity of the polyester and provides good flow properties combined with low crosslinking functionality and good film forming properties.

Poly-Epoxy Functional Component B,

The poly-epoxy functional component B preferably has a number averaged molecular weight Mn in the range between 100-1500 gr/mol, preferably 200-1500 or 300-1200 gr/mol. The low molecular weight of epoxy functional component B provides good crosslink density at low curing temperatures.

The poly-epoxy functional component B preferably has an epoxy equivalent weight EQW between 50 and 200, preferably 75-190 and more preferably 90-175 and most preferably 100-160 g/Eq. Preferably components B have an average epoxy functionality from 2.0 to 3.0 and the most preferred epoxy functional components B comprise 2 or 3 epoxy groups and are not on a polymeric backbone. This is chosen in view of providing a good crosslinking density and good mechanical properties of the cured coating.

Component B is preferably chosen from the group of polyfunctional epoxy-ester or polyfunctional epoxy-isocyanurates or combinations thereof. Suitable components B are diglycidyl terephthalate, triglycidyl trimellitate or triglycidyl isocyanurate or combinations thereof, preferably combinations of diglycidyl terephthalate and triglycidyl trimellitate.

The poly-epoxy functional component B in the composition can be a combination of two or more different components B, but in that case it is preferred that the weight average of the preferred features of the two or more components C in the composition, like the Mn, EQW and epoxy functionality, is in the above described ranges. It is preferred that at least 70, 80 or 90 and most preferably 100 wt % of all components B in the composition are components B having one or more of the preferred features as described above for component B.

Similarly for each of components A, C, or D it applies that it is preferred that at least 70, 80 or 90 and most preferably 100 wt % of all components A, C, or D respectively have one or more of the preferred features as herein described for the components A, C, or D respectively.

Poly-Anhydride Functional Component C;

The powder coating composition according to the invention comprises a polyanhydride component C which provides in addition to component A acid groups for crosslinking with component B. Apart from that, component C works as a plasticizer in the composition which promotes the flow and film forming properties of the composition. The molecular weight of component C is preferably not too low and the amount not be too high as too high plasticizing effect may cause storage stability problems. So preferably, Component C has a number averaged molecular weight Mn, as determined with GPC, in the range between 300 and 6000 gr/mole, preferably between 500 and more preferably between 800 and 2000 gr/mole. The anhydride functionality of the poly anhydride component C preferably is 2 to 10.0, between 2 and 9, more preferably between 3 and 9.

Storage problem can also be reduced by choosing a higher molecular weight of the polyester A. In fact, the plasticizing effect of component C allows the use of higher molecular weight (Mn) polyester A, typically more than 2500, 3000, 3200 or even 3500 gr/mole with still a low viscosity, good flow at low temperatures and good film forming properties and which is also beneficial for mechanical properties of the resulting coating. In general, good results can be obtained when the viscosity of a mixture of components A+C is lower than 6000 (mPas at 200° C.) and more preferably lower than 5000 (mPas at 200° C.). Such mixture can comprise component A having a certain amount of branching monomer as specified herein. Preferably however, the viscosity of a mixture of components A+C is lower than 4000, preferably lower than 3500, 3000, 2500 or 2000 and can even be lower than 1500 or 1000 (mPas at 200° C.). In case the viscosity of the mixture of A+C is higher than 3000, the polyepoxy component B preferably has Mn below 2500, preferably 2000, 1000 or even 500.

Preferred components C are aliphatic polyanhydrides. Suitable component C can be chosen from the group of polysebacic polyanhydride, polyazelaic polyanhydride, polydodecandioic polyanhydride or polyadipic polyanhydride.

The invention also relates to a poly-acid functional polyester composition for use in a durable low temperature curing powder coating composition, said composition comprising a poly-acid functional polyester A
  a. having an acid number of from 20 to 50 mg KOH/g and a hydroxyl number of less than 15 mg KOH/g,
  b. being formed from polyol and poly-acid constituents wherein at least 60 mole % of the poly-acid constituents in the polyesters are isophthalic acid,
  c. having, in case of a branched polyester A, a polydispersity Mw/Mn as determined with GPC in the range between 1.3 and 5, preferably between 1.3 and 4.5 or, in case of a linear polyester A, in the range between 1.3 and 3.5, preferably between 1.3 and 2.5,
  d. having a DSC mid-point Tg as determined at heating rate of 10° C./min in the range 40-80° C.,
  e. having a number averaged molecular weight Mn, as determined with GPC, in the range between 2000 and 10000 gr/mol,
  f. said composition preferably comprising additionally a polyanhydride functional component C,
  g. said composition optionally comprising additionally a curing catalyst D.

As component C does not react with polyester component A, a mixture of these components is chemically stable. The invention also relates to a mixture of the polyester component A and the polyanhydride component C as specified herein and to the use thereof as the acid functional component in an epoxy-acid powder coating composition.

Curing Catalyst D

The degree and the rate of crosslinking is in part determined by the amount of catalyst. The amount of catalyst should not be too high to allow sufficient time for flow and film formation, it should not be too low because that would result in low crosslinking density and poorer mechanical properties. The catalytic activity is best reflected by the resulting gel-time. This is the time after start of crosslinking reaction which the viscosity rises such that the material ceases to be free flowing (see method description).

In general good balance of properties can still be achieved with gel times between 100 and 800 sec at the curing temperature of 130-140° C. The amount of curing catalyst D is preferably chosen to get a gel time of 200-800 seconds, preferably 250-600 seconds, more preferably 300-500 and more preferably 400 seconds+/−20 or 10% determined at a curing temperature of 140° C., on a composition having a ratio R of 0.95 wherein R is defined as the ratio of moles of acid groups in components A and C to moles of epoxy groups in component B. The amount of D is preferably determined to result in the gel time as described above at the envisaged curing temperature, preferably in the range between 130-140° C.

Suitable curing catalyst component D can be selected from the group consisting of amines, phosphines, ammonium salts, phosphonium salts, blocked amine or phosphine catalysts, encapsulated catalysts and combinations thereof, preferably alkyl/arylphosphoniumhalogenide, more preferably ethyl-triphenylphosphonium bromide.

The Composition

The powder coating composition according to the invention comprises, preferably consists of;
  a. between 40 and 97 wt. % of component A, preferably 50-80, more preferably 55-75 wt %
  b. between 1 and 40 wt. % of component B, preferably 3-30, more preferably 5-20, most preferably 7-15 wt %,
  c. between 0.1 and 10, preferably between 0.5 and 5, more preferably between 1 and 3 wt. % of component C,
  d. between 0.1 and 5 wt. % of component D,
  e. optionally up to 24 wt % powder coating additives, preferably selected from pigments, dyes, leveling agents, flow improvers and UV stabilizers,
  f. less than 5, preferably less than 3 and more preferably less than 1 wt % volatile organic components,
wherein the wt % of A, B, C and D is expressed as the weight percentage of the total weight of components A, B, C and D and Wt % of components e and f are expressed relative to total weight of the powder coating composition.

The ratio R, defined as the ratio of moles of acid groups in components A and C to moles of epoxy groups in component B, is between 0.8 and 1.2, preferably 0.9 and 1.1 and more preferably between 0.9 and 1.

The amount of component C in the composition is generally between 0.1 and 20 wt. %, more preferably between 0.1 and 10, even more preferably 0.5 and 15 wt. % and most preferably between 1 and 10 wt. %. The amount is chosen to give a minimum acceptable level of coating chemical and mechanical properties through increasing crosslink density. Apart from the fact that C maybe a plasticizer, a higher amount of C also requires a higher amount of curing agent B which can also contribute to plasticization, specifically PT910/912 can act as a plasticizer. It was found that there is no detriment to coating properties of a higher amount of component C because it will react into the polymer network.

The powder coating composition according to the invention typically is in the form of a powder, but can also be in the form of a kit of parts comprising a Part 1 comprising component A and component C and a Part 2 comprising component B wherein Part 1 or 2 or both, but preferably only Part 1, comprise component D.

In a preferred process for the manufacture of the powder coating composition the components A+C are mixed separately in a first step and B is mixed in in a second step. The advantage of first mixing A+C and later with B is that B can more easily be mixed into A+C than in prior art mixing A+B because it involves less shear stresses of mixing the low Mw compound B in and by consequence less risk of reaction of A and B in the mixing extruder. It is believed less shear force is needed because A is plasticized by C. C lowers the viscosity of A when A and C are mixed in the melt and C is a plasticizer in that it lowers the Tg of the composition. A lower risk of reaction is also attained because component B can be mixed in more easily because of the relatively low molecular weight (Mn between 100 and 1500 gr/mol) and low EQW (50-200 gr/Eq), so a plasticizing effect also results from the level of B. However, the plasticizing effect should not be too high in view of avoiding too low shear in the extruder and worse dispersion (ie worse mixing). After the mixing the melt is quickly cooled to prevent premature reaction.

The invention also relates to a process for the manufacture of a powder coating composition comprising the steps of:
a. Providing an acid functional polyester composition according to the invention comprising an acid functional polyester component A and a polyanhydride functional component C and optional crosslinking catalyst D,
b. Adding and mixing polyepoxy component B and optional powder coating additives, preferably selected from pigments, dyes, leveling agents, flow improvers, UV stabilisers
c. adding crosslinking catalyst D in step b and/or with the acid functional polyester composition,
d. cooling.

The invention also relates to a process for coating a substrate comprising the steps of applying a layer of a powder coating composition of the invention on at least one surface of said substrate and heating the coated substrate to a temperature between 120 and 160° C. to thermally cure the coating thereon to form an adherent layer of the coating composition on the substrate. The process is particularly useful if the substrate is a heat-sensitive substrate such as wood, in particular medium density fibre board (MDF), plastics and certain low melting metal alloys. The cured coating has a crosslink density of at least 0.05 mmole/ml, preferably at least 0.08, more preferably at least between 0.1 and most preferably at least 0.15 mmole/ml which provides good solvent resistance. The invention also relates to an article coated at least partially with a powder coating composition of the invention, which have improved appearance and/or mechanical properties and reduced degradation effects due of the low temperature curing.

Test Methods

1. Acid Value

A freshly prepared solvent blend of 3:1 xylene:methoxy propanol is prepared. A quantity of resin is accurately weighed out into a 250 ml conical flask. 50-60 ml of 3:1 xylene:methoxy propanol is then added. The solution is heated gently until the resin is entirely dissolved and ensuring the solution does not boil. The solution is cooled to room temperature and titrated with standard potassium hydroxide until the end point is reached. (Reappearance of pale color, ideally matching that in the stock bottle solution). The acid value is calculated as follows:

$$\text{Acid Value (mg}KOH/g) = \frac{\text{Titre/mL} \times N}{\text{Mass of Resin/g}}$$

$N$ = normality of potassium hydroxide solution

2. Hydroxy Value OHV

The OHV was determined by manual titration of the prepared blanks and sample flasks. The indicator solution is made up by dissolving 0.80 g of Thymol Blue and 0.25 g of Cresol Red in 1 L of methanol. 10 drops of indicator solution is added to the flask which is then titrated with the standardized 0.5N methanolic potassium hydroxide solution. The end point is reached when the color changes from yellow to grey to blue and gives a blue coloration which is maintained for 10 seconds. The hydroxy value is then calculated according to:

$$\text{Hydroxy Value} = (B-S) \times N \times 56.1/M + AV$$

Where:
B=ml of KOH used for blank titration
S=ml of KOH used for sample titration
N=normality of potassium hydroxide solution
M=sample weight (base resin)
AV=Acid Value of the base resin The Net Hydroxy Value is defined as: Net OHV=(B−S)× N×56.1/M 3. Viscosity Viscosity is measured using VIS002 Cone & Plate 0 ps-5200 ps (Variable Speed) for viscosity determination of high viscosity polyesters (using an ICI Cone and Plate viscometer at 200° C. The required cone is selected and correctly fitted. The cone for this instrument is a 0-40 ps cone, which is also referred to as Cone 'D'. The cone and plate are cleaned using xylene. The needle is correctly zeroed. A small amount of the resin sample is placed on the heated plate such that when the cone is lowered, a small excess spreads out around the side. The sample is thoroughly de-gassed by raising and lowering the cone a several times, while pressing the cone rotation button. A reading is then taken. This process is repeated until a reproducible highest stable reading is obtained.

4. Resin Gel Time

A resin sample (approx. 60 g) is taken from the reactor after the addition of the accelerator and left to cool to room temperature. The acid value of the resin is measured and based on this value, the amount of PT910 required to give the stoichiometric ratio r=0.95, according to r=(moles of acid from the polyester)/(moles of epoxy from PT910), is calculated. The resin and PT910 are accurately weighed out and ground together in a coffee grinder for 30 s. Care is taken to ensure that the temperature of mix remains close to ambient to avoid impact fusion of the powder.

A Coesfeld Material test gel tester is used to determine the resin gel time. Prior to testing, the gel tester is set to 140° C. and the instrument allowed to stabilize at the test temperature. The hot plate is screened to prevent air movement affecting temperature stability.

Once the gel tester temperature has stabilized, a controlled amount of the ground powder is placed into the gel tester hot plate and the timer is started. As the sample starts to melt, the material is compounded with a wooden cocktail stick using a circular motion. As the sample reacts, the viscosity rises until a point is reached when the material ceases to be free flowing and starts to form a tacky cohesive ball. The end point is reached when the sample is in this condition and is able to detach from the tip of the stick or from the surface of the hot plate. Immediately stop the timer and record the result in seconds. The test is repeated until at least two sets of results are consistent.

5. Molecular Weight by GPC

The weight and number average molecular weight and the molecular mass distribution of the polymers was determined with Gel Permeation Chromatography (GPC) on an Alliance 2690 system with Waters 410 Refractive index (RI) detector using as eluens Hexafluoroisopropanol and 0.02M potassium trifluoroacetate at 35° C. and a PFG (Polar Flouro Gel) 7 µm linear gel column (300×8 mm), Polymer Standards Services (PSS) using calibration by Polymethylmethacrylate standards (M range 505 g/mol-2,740,000 g/mol).

6. Tg by DSC

The Tg values reported herein are the mid point Tg's determined at the inclination point of the DSC curve. The DSC curve was determined using a heating rate of 10° C./min.

7. Impact Test

The Impact test was carried out in accordance with ISO 6272-2/ASTM D 2794 (Class 1: powder coatings; one- and two-coat) on the powder coatings panels on the reverse side, whereas the results are assessed on the coated side using an indenter diameter of 15.9 mm and impact energy: 2.5 Nm. and using a Sheen Model 806 impact testing machine, 40 inch tubular tester with 15.9 mm (0.625") indenter and 16.3 mm (0.640") die.

Panels were prepared as described below. In order to ensure a statistically representative result, each test consists of six impacts across one panel with the coating applied at a consistent thickness of 60-80 µm. The results are quoted as the number of impact domes that show no evidence of coating failure, according to accreditation bodies for Architectural specifications.

8. Crosslinking Density and Tg of the Cured Film Process Method

The cross-link density parameter XLD is determined using dynamic mechanical thermal analysis (DMTA) measuring a free-standing cured coating of a layer thickness of about 30 to 50 µm. The cross-link density parameter XLD was determined using dynamic mechanical thermal analysis (DMTA) following the general procedure as described in detail in ASTM manual MNL17-2ND (Dynamic Mechanical and Tensile Properties, published 2012) using free-standing coating films measured in tensile mode on a modified Rheovibron (Toyo Baldwin type DDV-II-C) DMTA apparatus at a frequency of 11 Hz with a dynamic tensile strength of 0.03%. The cross-link density was calculated from the storage modulus above Tg and was corrected for the effect of the pigment particles.

9. Flexibility (Conical Mandrel)

Flexibility of a coating was tested in accordance with ASTM D522-93a(2008) Standard Test Methods for Mandrel Bend Test of Attached Organic Coatings using a Sheen Conical mandrel bend Tester. The test panel is clamped onto a varying-radius mandrel and force applied to bend the coated panel. The test panel is then visually examined for evidence of cracking along the deformed surface.

10. Resistance to Chipping

Resistance to Chipping was assessed using the multiple impact Resistance to Chipping test (BS AU 148:Part 15). The test panel is placed at an angle of 45 degrees at the bottom of a 4.5 m pipe. The pipe is supported vertically and fitted with a slide across the pipe, 50 mm from the top. The pipe is loaded with 100 6 mm hexagon nuts, the retaining slide is then removed allowing the nuts to fall and impact the coating, simulating stone chipping. The coating surface is then visually inspected for degree of chipping and rated from 1 (very slight) to 6 (very severe).

11. Weathering

Resistance to weathering was assessed using the weatherometer and UV exposure testing.

12. Blooming

Resistance against blooming was assessed by placing an applied panel in a gradient oven and subjecting to a temperature gradient across the panel for 30 minutes. The gloss of each gradient section is then measured and plotted against temperature. Bloom manifests itself as a varying loss of gloss over a specific temperature range. The more severe the bloom, the lower the gloss observed.

13. Solvent Resistance

Resistance to solvent was assessed by placing a cotton wool pad over the ball head of a nominal 1 lb (0.454 kg) ball headed hammer. This is covered with a 5 cm square of suitable fabric. The cotton pad and fabric are secured to the hammer with a cable tie, ensuring that the fabric is taut and without wrinkles, creases or bagginess. Sufficient methyl ethyl ketone is applied to the fabric to wet thoroughly the cotton wool without leaving excess solvent. The ball head of the hammer is placed on the painted surface of a prepared panel of the paint to be tested. The hammer is pushed across the width of the panel and then pulled back to its original position. Care is taken to ensure no downward or upward pressure is exerted on the hammer during this action. This constitutes one double rub and should take approximately 1 second. This is repeated 300 times, or until the coating fails (the coating is rubbed through to the metal surface) if this is sooner. The number of double rubs to nab through, or 300 if no rub through is observed, is noted.

14. Appearance

To assess flow and appearance, powder coated test panels are compared to a set of Powder Coating Institute standard panels. These panels represent the degrees of smoothness achievable with powder coatings and have graduated degrees of orange peel (flow) and powder smoothness from rough to smooth. The standard panels consists of ten 4×6 inch panels which are painted black and labeled with their corresponding orange peel (flow) rating from 1 to 10. The test panels are compared to the standard panels in order to visually evaluate the appearance of painted test panels. The test panels are assigned the value of flow most closely matching that of the standard panels.

Abbreviations

TABLE 1 description of the abbreviations used in the examples.

| | |
|---|---|
| NPG | Neopentyl glycol |
| EG | Ethylene glycol |
| IPA | Isophthalic acid |
| TPA | Terephthalic acid |
| AA | Adipic acid |
| TMA | Trimellitic Anhydride |
| Cardura E 10 | Cardura E 10 |
| Fascat 4101 | Butylchlorotin dihydroxide |
| BuSnTO | n-Butyl Tin Trioctoate |
| tBuP | Tributylphosphite |
| Additol P791 | Polyanhydride (ex Allnex) |
| EtTPPBr | Ethyl Triphenyl Phosphonium Bromide |
| PSPA | Polysebacic Polyanhydride |
| PAPA | Polyazelaic Polyanhydride |
| Araldite PT912 | Glycidylester crosslinker (ex Huntsman) |
| GMA 300 | Acrylic resin with glycidyl groups crosslinker (ex Estron) |
| AV | Acid value |
| Net OHV | Net Hydroxy value |
| OHV | Hydroxy value |
| Wt % | Weight percent |
| Fn(COOH) | Acid groups functionality |
| Mn | Number average molecular weight |
| Mw | Weight average molecular weight |
| Mw/Mn | Polydispersity |
| Tg | Glass transition Temperature |
| XLD | Cros slinking density |
| Film Tg | Glass transition Temperature of the cured film |

Polyester Preparation Examples 1-8 and Comparative A and Polyester B1

Example 1

Neopentyl glycol (NPG, 100%, 1597 g), distilled water (160 g) and polyesterification catalyst, Fascat 4101 (3.05 g)

are charged to a 5 L glass reaction vessel, equipped with stirrer, packed column with top thermocouple, condenser, distillate collection vessel, nitrogen line, vacuum line and thermocouple. The vessel is heated via an electric mantle until the contents are molten and mobile.

Isophthalic acid (IPA, 2475 g) is added to the vessel, nitrogen blanket is applied and the contents stirred vigorously. The vessel is continuously heated to maintain a column top temperature of around 102° C. indicating continuous distillation of reaction water. During the distillation process, the batch temperature is progressively increased to 230° C. The batch contents are regularly sampled, cooled and visually inspected for clarity. When batch contents are clear when cooled to room temperature, this is taken as an indication that Stage 1 of the polyesterification process is complete.

The acid value (AV), Net hydroxyl value (Net OHV) and viscosity are measured. Depending on the measured Net OHV and the theoretical target Net OHV (5 mgKOHg-1), a calculated quantity of NPG (the "NPG correction") is added to the reactor. Isophthalic acid (275 g) is also added. The batch is heated to ensure distillation continues and when necessary, the column is removed. When distillation stops, a sample is taken to check AV and Net OHV and if necessary an NPG correction is added. Once the NPG correction has been allowed to stir into the batch, vacuum is applied and batch temperature is maintained between 220° C. and 230° C. The batch is sampled regularly to check AV. When the target AV is reached (40 mgKOHg$^{-1}$), the batch is cooled to 200° C.

Polyanhydride Additol P791 is added to the reaction vessel, the amount of which is calculated as 2.2 weight percent (wt %) of the synthesized NPG/IPA polyester. The polyanhydride is stirred in for 10 minutes. Ethyltriphenyl phosphonium bromide (EtTPPBr) (0.6 wt % of the synthesized NPG-IPA polyester) is then added and stirred in for 5 minutes in order to give a gel time of 400 seconds when measured at 140° C. with Araldite PT910. The final AV of the polyester is 48.8 mgKOHg$^{-1}$, the final OHV is 2.1/ mgKOHg$^{-1}$ and the melt viscosity measured at 200° C. is 950 mPa·s.

Example 2

The composition was prepared as described in Example 1 except that instead of Additol P791, polysebacic polyanhydride is added to the reaction vessel, the amount of which is calculated as 1.4 weight percent (wt %) of the synthesized NPG/IPA polyester. The target AV of the NPG/IPA polyester is 39.4 mgKOHg$^{-1}$ comparable to Example 1. The composition details are given in Table 2.

Example 3

The composition was prepared as described in Example 2 using polysebacic polyanhydride except that the target AV of the NPG/IPA polyester is 35.2 mgKOHg$^{-1}$. The composition details are given in Table 2.

Example 4

The composition was prepared as described in Example 2 except that the target AV of the NPG/IPA polyester was 26 mgKOHg$^{-1}$. The composition details are given in Table 2.

Example 5

The composition was prepared as described in Example 1 except that instead of Additol P791, polyazelaic polyanhydride is added to the reaction vessel, the amount of which is calculated as 1.4 weight percent (wt %) of the synthetised NPG/IPA polyester.

Example 6

The composition was prepared as described in Example 1 except that the target net OHV of the 1st distillation was 40 mgKOH/g, in the 2nd distillation was introduced 2.5% of Trimellitic Anhydride, and the target AV reached has been 26.1 mgKOH/g. Finally a % of Ethyltriphenyl phosphonium bromide (EtTPPBr) is added in order to give a gel time of 390 seconds when measured at 130° C.

Example 7

The composition was prepared as described in Example 3 except that 66.3% of Isophthalic Acid has been substituted from Terephthalic Acid and the % of EtTPPBr has been reduced to 0.5%.

Example 8

The composition was prepared as described in Example 3 except that 30% of Isophthalic Acid has been substituted from Terephthalic Acid and the % of EtTPPBr is 0.6%.
Comparative Experiment A and Polyester B1

Compositions were prepared in accordance with prior art EP2272927 comprising polyester component A (Example 1) and polyester B1 (Example 4).

The resulting compositions were analyzed using the above described methods to determine the acid value AV, the hydroxy value OHV, the viscosity Visco (200° C.)/mPas, the glass transition temperature Tg, Table 2 gives the composition (in grams) and characteristics of Examples 1 to 8 and comparative Component A and polyester B1.

TABLE 2

| | polyester resin formulations | | | | | | | | | |
|---|---|---|---|---|---|---|---|---|---|---|
| | EP2272927 Component A | EP2272927 Polyester B1 | Example 1 | Example 2 | Example 3 | Example 4 | Example 5 | Example 6 | Example 7 | Example 8 |
| IPA | 110.94 | | 2750 | 2750 | 2750 | 2750 | 2750 | 2626 | 917 | 1926 |
| TPA | 563.62 | 629.39 | | | | | | | 1834 | 825 |
| AA | 62.62 | 87 | | | | | | | | |
| TMA | | | | | | | | 95 | | |
| NPG | 370.66 | 429 | 1597 | 1597 | 1617.4 | 1648 | 1597 | 1648 | 1617 | 1617 |
| EG | 41.18 | | | | | | | | | |
| Fascat 4101 | | | 3.1 | 3.1 | 3.1 | 3.1 | 3.1 | 3.1 | 3.10 | 3.10 |

TABLE 2-continued polyester resin formulations

| | EP2272927 Component A | EP2272927 Polyester B1 | Example 1 | Example 2 | Example 3 | Example 4 | Example 5 | Example 6 | Example 7 | Example 8 |
|---|---|---|---|---|---|---|---|---|---|---|
| BuSnTO | 2.25 | 1 | | | | | | | | |
| tBuP | 0.9 | 1 | | | | | | | | |
| Cardura E10 | | 61 | | | | | | | | |
| EtTPPBr | 5 | 4.7 | | | | | | | | |
| polyester data | | | | | | | | | | |
| AV | 33 | 16 | 40 | 39.4 | 35.2 | 26 | 39.7 | 26.1 | 35 | 34 |
| OHV | 3.3 | 16 | 3.5 | 5 | 9.7 | 4.5 | 5.2 | 2.9 | 3.5 | 3 |
| Visco (200° C.)/ mPas | 2300 | 1700 | 1200 | 1060 | 1480 | 3040 | 1170 | 3740 | 3600 | 2500 |
| Tg | 53 | 38.1 | 62.4 | 62.2 | 59 | 61.6 | 61.9 | 63.1 | 65.8 | 63.2 |
| Mn | | | 2967 | 2985 | 3158 | 4194 | 2980 | 4130 | 3200 | 3250 |
| Mw | | | 6255 | 6226 | 6968 | 9823 | 6180 | 12865 | 7072 | 7847 |
| Mw/Mn | | | 2.11 | 2.09 | 2.21 | 2.34 | 2.07 | 3.11 | 2.21 | 2.41 |
| Fn(COOH) | | | 2.16 | 2.10 | 1.98 | 1.94 | 2.11 | 1.92 | 1.99 | 1.97 |
| Additol P791 | | | 84.4 | | | | | | | |
| PSPA | | | | 53.1 | 47.5 | 34.7 | | 36.1 | 47.5 | 45.9 |
| PAPA | | | | | | | 52.2 | | | |
| EtTPPBr | | | 23.5 | 25.2 | 25 | 20.4 | 25.6 | 20.3 | 19.1 | 22.9 |
| AV | | | 48.8 | 46.4 | 38.8 | 29.1 | 45.2 | 30.2 | 39 | 38 |
| OHV | | | 2.1 | 4.2 | 4.4 | 3.8 | 1.9 | 4.6 | 3 | 2.5 |
| Visco (200° C.)/ mPas | | | 950 | 950 | 1.400 | 3070 | 960 | 3570 | 3300 | 2400 |
| Gel time (140° C.) | | | 411 | 406 | 389 | 398 | 406 | | 400 | 410 |
| Gel time (130° C.) | | | | | | | | 396 | | |
| Tg | | | 56 | 54 | 57 | 59 | 52 | 61 | 64 | 62 |
| Mn | | | 3274 | 2763 | 3488 | 4583 | 2677 | 4176 | 3250 | |
| Mw | | | 6880 | 6040 | 7343 | 10333 | 5929 | 14300 | 7453 | |
| Mw/Mn | | | 2.10 | 2.19 | 2.11 | 2.25 | 2.21 | 3.42 | 2.29 | |

Powder Coating Examples PC1 to PC10

The compositions comprising the acid functional polyester component, the polymeric polyfunctional anhydride and the crosslinking catalyst as prepared in Example 1 was made into various powder coatings compositions by mixing with epoxy functional component (Araldite PT912), pigments, leveling agent (Perenol F30), flow additive (Resiflow) and air release agent (Benzoin) according to the formulations described below and summarized in Table 3.

The components were premixed in a high speed Thermoprism Pilot Mixer 3 premixer at 1500 rpm for 20 seconds before being extruded in a Baker Perkins (formerly APV) MP19 25:1 L/D twin screw extruder. The extruder speed was 250 rpm and the four extruder barrel zone temperatures were set at 25, 35, 85 and 100° C. Following extrusion, coatings were ground using a Kemutec laboratory classifying microniser. The classifier was set at 10 rpm, the rotor was set at 8 rpm and the feed was set at 5.2 rpm. The coatings were sieved to 100 μm using Russel Finex 100 micron mesh Demi Finex laboratory vibrating sieves.

TABLE 3

Powder coatings formulations

| | Powder Coating Example | | | | | | | | | | |
|---|---|---|---|---|---|---|---|---|---|---|---|
| | PC1 | PC2 | PC3 | PC4 | PC5 | PC6 | PC7 | PC8 | PC9 | PC10 | PC11 |
| Colour | Red | Blue | Cream | Yellow | Black | White | Red | Blue | Cream | Black | White |
| Component | RAL 3009 | RAL 5003 | RAL 9001 | | | | RAL 3009 | RAL 5003 | RAL 9001 | | |
| Composition of Example 1 | 671.5 | 671.5 | 671.5 | 685.7 | 740.3 | 609.7 | | | | | |
| Composition of Example 6 | | | | | | | 701.9 | 701.9 | 701.9 | 775.7 | 635.6 |
| Araldite PT912 (1) | 89.3 | 89.3 | 89.3 | 92.2 | 100.5 | 79.3 | 58.9 | 58.9 | 58.9 | 65.1 | 53.4 |
| Pigmentation | 228.2 | 228.2 | 228.2 | 205.6 | 137.2 | 300.0 | 228.2 | 228.2 | 228.2 | 137.2 | 300 |
| Perenol F30 (2) leveling agent | 5.0 | 5.0 | 5.0 | | | | 5.0 | 5.0 | 5.0 | | |

TABLE 3-continued

Powder coatings formulations

| | Powder Coating Example | | | | | | | | | | |
|---|---|---|---|---|---|---|---|---|---|---|---|
| | PC1 | PC2 | PC3 | PC4 | PC5 | PC6 | PC7 | PC8 | PC9 | PC10 | PC11 |
| Resiflow PV88 (3) Flow Aid | 9.0 | 9.0 | 9.0 | 10.0 | 15.0 | 9.0 | 9.0 | 9.0 | 9.0 | 15.0 | 9.0 |
| Benzoin Degassing Agent | 2.0 | 2.0 | 2.0 | 6.5 | 7.0 | 2.0 | 2.0 | 2.0 | 2.0 | 7.0 | 2.0 |
| Total | 1005 | 1005 | 1005 | 1000 | 1000.0 | 1000 | 1005 | 1005 | 1005 | 1000 | 1000 |

(1) Huntsman;
(2) BASF;
(3) Worlée-Chemie

Comparative Powder Coating Examples CPC1, CPC2, CPC3 and CPC4

For comparison a state of the art commercially available powder coating compositions were used comprising an acid functional polyester (DSM Uralac P865 & P895) and comprises no polyfunctional anhydride. The resin used in Comparative Example CPC1 has a typical AV of 35 mgKOHg$^{-1}$. The comparative example contains no polyfunctional anhydride.

This polyester composition was compounded with a standard hydroxylalkylamide (HAA) crosslinker in a ratio polyester/crosslinker of 95:5 and further standard additives similar to what is described above for PC1-10. The composition was subsequently made into paint, sprayed and cured as described for the examples PC 1-10, except that this coating was cured at 180° C.

Additionally two state of art powder coating compositions CPC3 and CPC4 derived from EP2272927 were prepared from the Component A and Polyester B1 in combination with a glycidylic acrylic resin GMA300, Araldite PT912 and dodecandioic acid. These comparative examples are not containing polyfunctional anhydride. The compositions were subsequently made into paint, sprayed and cured as described for the examples PC 1-10, except that this coating was cured at 150° C. for 10'. Table 4 shows the powder coating formulation used for CPC1, CPC2, CPC3 and CPC4.

TABLE 4

Powder Coating composition of Comparative Examples

| Powder Coating Example | CPC1 | CPC2 | CPC3 | CPC4 |
|---|---|---|---|---|
| Colour Component | Black | White | Brown RAL 8014 | White |
| Comparative Example Resin 1 Uralac P865 | | 602.6 | | |
| Comparative Example Resin 2 Uralac P895 | 798.8 | | | |
| Comparative example Component A and Polyester B1 | | | 604 | 604 |
| Dodecandioic acid | | | 12 | 12 |
| Araldite PT912 (1) | | | 40 | 40 |
| GMA 300 (2) | | | 34.5 | 34.5 |
| Hydroxyalkylamide | 42 | 31.7 | | |
| Pigmentation | 137.2 | 354.9 | 296 | 296 |
| Resiflow PV88 (3) Flow Aid | 15 | 8.6 | | |
| Modaflow P 6000 | | | 10 | 10 |
| Benzoin Degassing Agent | 7 | 2.2 | 3.5 | 3.5 |
| Total | 1000 | 1000 | 1000 | 1000 |

(2) GMA 300: glycidyl acrylic resin from Estron

Powder Coating Evaluation

For evaluating the powder coating quality, the obtained powders were applied onto panels using a Nordson Surecoat corona spray gun. For appearance assessment, coatings were applied onto 100 mm×300 mm aluminum panels. For weathering tests, coatings were applied onto 100 mm×150 mm aluminum panels. For mechanical tests, coatings were applied onto 100 mm×150 mm pretreated steel panels. All the coatings were cured at 140° C. for 20 minutes and the coatings PC7 to PC11 based on example 6 were cured at 130° C. for 30' minutes following an initial ramp time of 5 minutes. The cured film thickness was 60-80 μm. The samples were cooled by ambient conditions and the appearance, weathering and mechanical tests were done between 24 and 36 hours after curing.

Appearance

Figure 2:
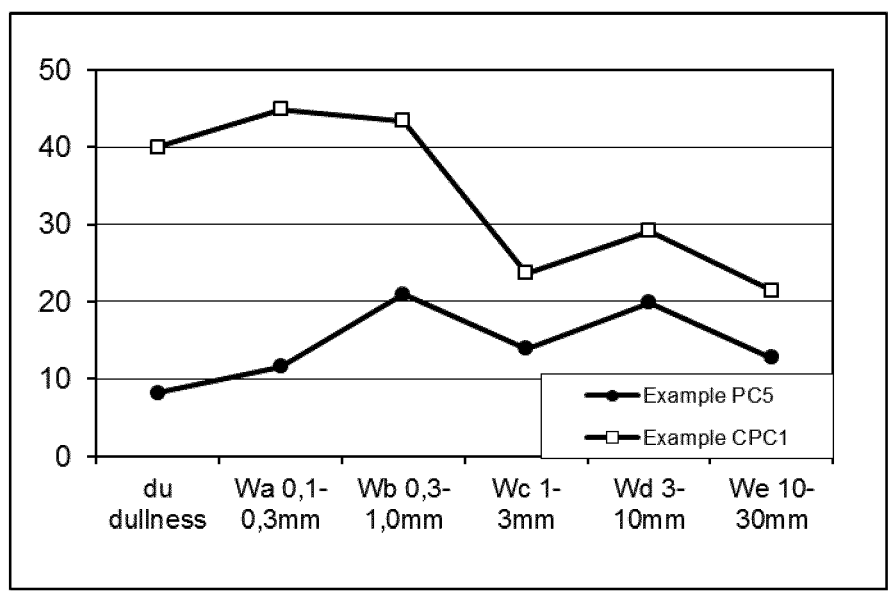
FIG. 2 shows the Wavescan spectrum for Example PC5 and Comparative Example CPC1.

FIG. 1 shows a Photographic image of the coating surface of Example PC4 formulated in yellow, crosslinked with PT912 and cured at 140° C. and the schematic diagram of the methodology showing the reflection of light passing through a template of parallel rectangular spaces, creating areas of high contrast, as shown in the schematic diagram. By looking at these areas of contrast, the image shows visually the high degree of flow achievable and also the high distinction of image indicated by Wavescan measurements. FIG. 2 below shows the Wavescan spectrum for Example PC5 and comparative example CPC1 (a standard hydroxylalkylamide (HAA) system) cured at 180° C.

The values for the long and short wave components (LW and SW respectively) and Distinction of Image (DOI) were evaluated from the wavescan spectrum in the known way. The obtained values are given in Table 5 below and show that even when cured at 140° C., the powder coating composition of the invention (Example PC5) is capable of achieving better DOI, and appearance in general, than an HAA system cured at 180° C.

TABLE 5

Wavescan data for Example PC5 and a standard HAA system of CPC1

| System | LW | SW | DOI |
|---|---|---|---|
| PC5 | 8.1 | 18.1 | 91.0 |
| CPC1 | 14.6 | 31.1 | 73.6 |

Mechanical Properties

Mechanical properties of powder coatings PC4 based on Example 1 and PC10 based on Example 6 have been evaluated according to the methods as described above. Both impact resistance and flexibility have been measured as a function of time (over a four-week period) to determine both initial and ageing responses. Table 6 indicates that no loss of mechanical impact resistance or flexibility was seen over the four week testing period. This data shows that the powder coatings of example PC4 and PC10 have excellent mechanical performance also after ageing.

TABLE 6

Mechanical impact and flexibility measured over a four week period

| | PC4 based on Example 1 | | PC10 based on Example 6 | |
|---|---|---|---|---|
| Time Period after Cure | Mechanical Impact | Conical Mandrel | Mechanical Impact | Conical Mandrel |
| 1 hr | 6 pass | No cracking | 6 pass | No cracking |
| 1 wk | 6 pass | No cracking | 6 pass | No cracking |
| 2 wks | 6 pass | No cracking | 6 pass | No cracking |
| 4 wks | 6 pass | No cracking | 6 pass | No cracking |

Resistance to chipping has also been measured as described above. The coating surface was visually inspected for degree of chipping and the powder coating of example PC4 scored a 2 (slight degree of chipping) and other coatings according to the invention also scored a 2. This test indicates that robust coatings with good chipping resistance can be produced with powder coating compositions according to the invention even when cured at 140° C. for 20 minutes or in the case of PC10 when cured at 130° C. for 30 minutes.

Crosslinking Density

The crosslinking density (XLD) and Tg of cured film (Film Tg) has been measured as described above. The panels based on PC5 and PC10 after 20 minutes curing at 140° C. and respectively 30 minutes at 130° C. are tested vs curing for 10 and respectively 45 minutes. Table 7 indicates that after 20 and 30 minutes respectively both coatings are fully cured because have reached the same cross-linking density and Tg measured after 45 minutes.

TABLE 7

Crosslinking density and Tg of the cured film

| Coating | Curing Conditions | XLD mmol/cc | Film Tg ° C. |
|---|---|---|---|
| PC5 | 140° C. * 10' | 0.004 | 85.4 |
| | 140° C. * 20' | 0.074 | 87.3 |
| | 140° C. * 45' | 0.074 | 87.4 |
| PC10 | 130° C. * 10' | 0.003 | 65 |
| | 130° C. * 30' | 0.100 | 76.4 |
| | 130° C. * 45' | 0.101 | 76.4 |

Weathering

Figure 3A:
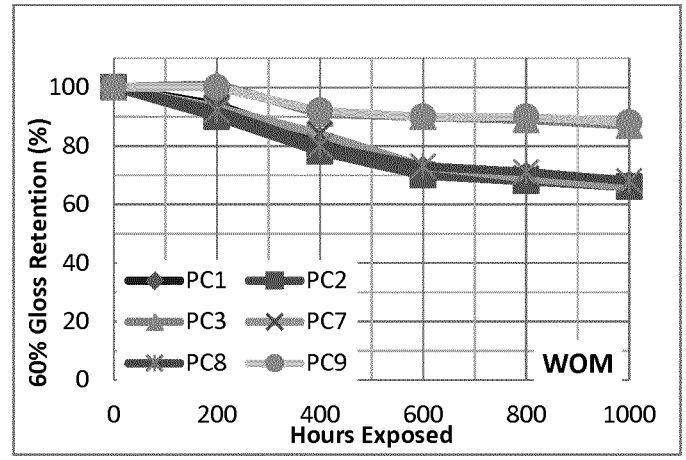
FIGS. 3a and 3b below shows the accelerated weathering performance (WOM) and QUV-B test respectively of the powder coatings based on examples 1 and 6: PC1, PC2, PC3 and PC7, PC8 and PC9 respectively.
Figure 3B:
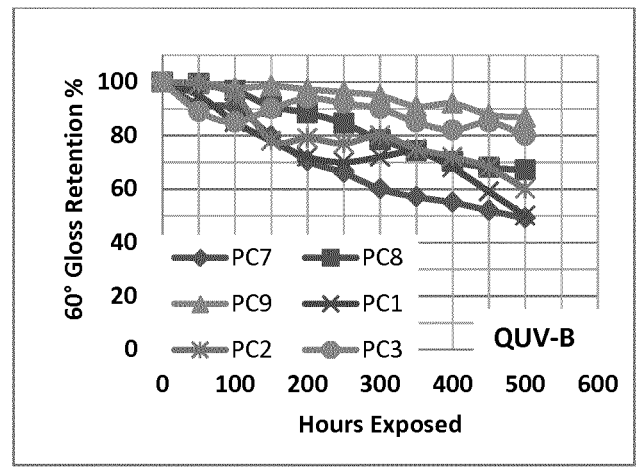

FIGS. 3a and 3b show the accelerated weathering performance of the powder coatings based on examples 1 and 6 in red, blue and cream tested in Weather-o-meter (WOM) and QUV-B test respectively. In both tests, the powder coatings according to the invention easily reach the specification of 50% gloss retained after 1000 hours and 300 hours respectively for WOM and QUV-B, as stipulated for durable performance by accreditation bodies. In QUV-B, the powder coatings reach a minimum of 450 hours in all three colors tested. CPC 3 (brown coating) with only 34% of residual gloss % after 300 hours QUV-B didn't reach the specification requested for QUV-B.

Bloom Response

Figure 4:
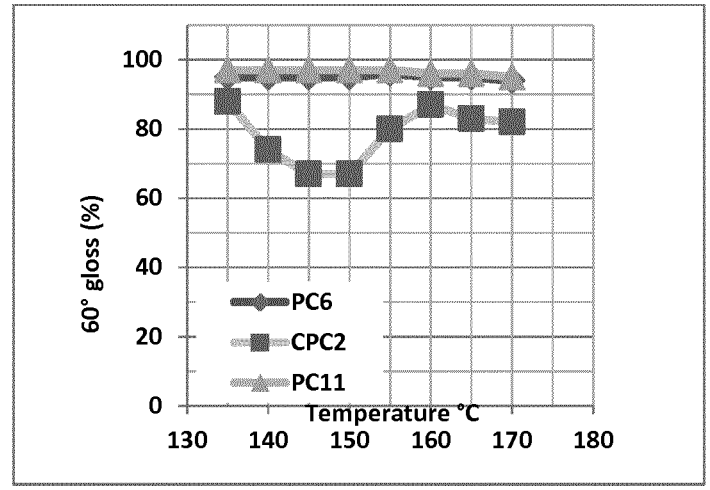
FIG. 4 shows the bloom response of example PC6, PC11 and comparative example CPC2.

Blooming was measured as described above. FIG. 4 compares the performance of the powder coating of example PC6 (triangle) and example PC11 (romb) against a typical blooming HAA resin of comparative example CPC2 (squares) when formulated in a white coating formulations. PC6 and PC11 were cured with PT912 and CPC2 with HAA. The response clearly shows no loss of gloss observed with the powder coatings of the invention, indicating no formation of bloom, whereas there is significant blooming (loss of gloss) in the comparative powder coating. A similar comparison has been conducted between PC6 and CPC4 based on EP2272927 patent, finding a comparative drop of gloss in the case of CPC4 (decreased from 100% to 70% between the curing at 135° C. and the one at 150° C.) whereas PC6 is showing newly almost no gloss drop.

Black Powder Coating Examples PCB5 and Comparative Example CPC1

The polyester of Example 3 was formulated as described above for PC5 to black powder coating formulation PCB. Panels were prepared as described above for mechanical testing and stoved for 20 mins at 140° C. PC10 was instead cured for 30' at 130° C. Comparative example CPC1 was prepared in the same way but has been stoved 10 mins at 200° C. The gloss, MEK resistance, Reverse impact, PCI flow and QUVB resistance test results are summarized in Table 8.

TABLE 8

Coating properties of black powder coating formulations of polyesters of Examples 1-6) and of CPC1

| | CPC1 | PCB 3 | PC10 |
|---|---|---|---|
| Gloss (20°) | 75 | 87 | 87 |
| Gloss (60°) | 94 | 96 | 96 |
| MEK resistance (double rubs to rub through) | 298 | 300 | 300 |
| Reverse Impact 2.5 Nm tested after 1 week | Pass | Pass | Pass |
| PCI Flow | 7 | 8 | 5 |
| % Gloss Retention after 300 hrs QUVB Exposure | 82 | 93 | 84 |

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A powder coating composition for low temperature curing comprising:
   a. a poly-acid functional polyester component A,
   b. a poly-epoxy functional component B,
   c. a poly-anhydride functional component C; and
   d. a curing catalyst D,
   wherein component A has an acid number (AV) of 20 to 50 mg KOH/g and a hydroxyl number (OHV) of less than 15 mg KOH/g, and
   wherein component A is formed from one or more polyols and one or more poly-acid constituents wherein of the poly-acid constituents in the polyesters at least 60% are isophthalic acid and less than 15 wt % are terephthalic acid.

2. The powder coating composition of claim 1, comprising one or more of the following characteristics:
   a. component A has a number averaged molecular weight Mn, as determined with GPC, in the range between 1000-10000 g/mol,
   c. component A comprises polyacid branching monomers comprising at least three carboxyl groups in an amount below 9 wt % relative to the weight of polyester component A, d. component A comprises polyol branching monomers comprising at least three hydroxyl groups in an amount below 9 wt % relative to the weight of polyester component A or wherein component A comprises a combination of polyol and polyacid monomers in a total amount of these monomers below 9 wt %, e. component A comprises branching monomers and has a polydispersity Mw/Mn in the range between 1.3 and 5, f. component A has a polydispersity Mw/Mn in the range between 1.3 and 3.2, g. the acid functionality of component A is 1.5-3.5, wherein functionality is defined as the average number of acid groups per molecule as calculated by Mn/(56100/AV), h. component A has a DSC mid point Tg as determined at heating rate of 10° C./min in the range 40-80° C.

3. The powder coating composition according to claim 1, comprising one or more of the following characteristics:

a. component B has a number averaged molecular weight Mn in the range between 100 1500 g/mol, b. component B has an epoxy equivalent weight between 50 and 200 g/Eq, c. the epoxy functionality of component B is 2.0-3.0, d. component B is chosen from the group of polyfunctional epoxy-ester or polyfunctional epoxy-isocyanurates or combinations thereof, e. component B is diglycidyl terephthalate, triglycidyl trimellitate or triglycidyl isocyanurate or combinations thereof, f. at least 70 wt % of all components B in the composition have any of the above features.

4. The powder coating composition according to claim 1, comprising one or more of the following characteristics:

a. component C has a number averaged molecular weight Mn, as determined with GPC, in the range between 300 and 6000 g/mol, b. the anhydride functionality of the poly anhydride component C is 2 to 10.0, c. component C is an aliphatic polyanhydride, d. component C is one or more components selected from the group consisting of polysebacic polyanhydride, polyadipic polyanhydride, polyazelaic polyanhydride and polydodecandioic polyanhydride.

5. The powder coating composition according to claim 1, wherein curing catalyst component D is selected from the group consisting of amines, phosphines, ammonium salts, phosphonium salts, blocked amine or phosphine catalysts, encapsulated catalysts and combinations thereof.

6. The powder coating composition according to claim 1 consisting of:

a. between 40 and 97 wt. % of component A,
b. between 1 and 40 wt. % of component B,
c. between 0.1 and 10, wt. % of component C,
d. between 0.1 and 5 wt. % of component D,
e. optionally, up to 50 wt % powder coating additives,
f. less than 5 wt % volatile organic components,
wherein the wt % of A, B, C and D is expressed as the weight percentage of the total weight of components A, B, C and D and wt % of components e and f are expressed relative to total weight of the powder coating composition.

7. The powder coating composition according to claim 1, wherein ratio R, defined as the ratio of moles of acid groups in components A and C to moles of epoxy groups in component B, is between 0.8 and 1.2.

8. The powder coating composition according to claim 1, wherein the amount of curing catalyst component D is chosen to get a gel time of 200-800 seconds +/−40% determined at 140° C. on a composition having a ratio R of 0.95 wherein R is defined as the ratio of moles of acid groups in components A and C to moles of epoxy groups in component B.

9. The powder coating composition according to claim 1 in the form of a kit of parts comprising a Part 1 comprising component A and component C and a Part 2 comprising component B wherein Part 1 or 2 or both, comprise component D.

10. The powder coating composition according to claim 1, wherein the poly-acid functional polyester A further has each of the following properties c.-e.:

c. has, in case of a branched polyester A, a polydispersity Mw/Mn, as determined with GPC, in the range between 1.3 and 5 or, in case of a linear polyester A, in the range between 1.3 and 3.5, d. has a DSC mid-point Tg as determined at heating rate of 10° C./min in the range 40-80° C., e. has a number averaged molecular weight Mn, as determined with GPC, in the range between 2000 and 10000 gr/mol.

11. A process for the manufacture of a powder coating composition according to claim 1 comprising the steps of:

a. providing an acid functional polyester composition according to claim 10 comprising an acid functional polyester component A and a polyanhydride functional component C and crosslinking catalyst D, b. adding and mixing polyepoxy component B and optional powder coating additives, c. adding crosslinking catalyst D in step b and/or with the acid functional polyester composition, d. cooling.

12. A process for coating a substrate comprising the steps of applying a layer of a powder coating composition of claim 1 on at least one surface of said substrate and heating the coated substrate to a temperature between 120 and 160° C. to thermally cure the coating thereon to form an adherent layer of the coating composition on the substrate.

13. The process of claim 12 wherein the substrate is a heat-sensitive substrate.

14. An article coated at least partially with a powder coating composition of claim 1.

15. The process for the manufacture of powder coating composition according to claim 11, wherein the acid functional polyester component A is formed in a 2 step process comprising the steps of:

a. polymerizing the polyacid and polyol at elevated temperatures between 100 and 250° C. while continuously distilling off water formed, optionally in the presence of a polyesterification catalyst, b. determining the AV and the Net OHV and adding based on the measured Net OHV and AV a pre-calculated amount of polyacid and polyol to obtain after further polymerization a polyester having AV between 20 and 50 mg KOH/g and a OHV of less than 15 mg KOH/g.

* * * * *